United States Patent Office 3,126,370
Patented Mar. 24, 1964

3,126,370
AZO DYESTUFFS CONTAINING DIHALOGEN-PYRIDAZONE GROUPS
Hans Ruprecht Hensel, Heidelberg, Hans Baumann and Karl Dury, Ludwigshafen (Rhine), and Wilhelm Federkiel, Frankenthal, Pfalz, Germany, assignors to Badische Anilin- & Soda-Fabrik Aktiengesellschaft, Ludwigshafen (Rhine), Germany
No Drawing. Original application June 23, 1960, Ser. No. 38,107. Divided and this application Apr. 25, 1963, Ser. No. 275,531
Claims priority, application Germany June 25, 1959
14 Claims. (Cl. 260—154)

This invention relates to monoazo and diazo dyestuffs which contain one to two 4,5-dihalogenpyridazone-(6) groups.

It is an object of this invention to provide dyestuffs which dye textile materials of wool, synthetic linear polyamides or cellulose in excellent fastness, especially outstanding wet fastness, and in brilliant shades. The term textile materials is intended to include for example fibers, flock, threads, woven or non-woven textiles. The expression "cellulose" includes native and regenerated cellulose, as for example cotton or rayon. Examples of synthetic linear polyamides are for example nylon 66, nylon 6 and nylon 11.

A further object of the invention is to provide a process for the production of the said new azo dyestuffs.

We have found that the said new azodyestuffs are obtained by coupling an aromatic diazo compound with an aliphatic, aromatic or heterocyclic compound capable of coupling, and choosing the diazo and/or coupling components used so that the resultant azo dyestuff contains one to two 4,5-dihalogenpyridazone-(6) radicals of the general formula

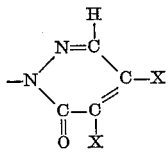

in the molecule, X representing a chlorine or bromine atom.

The preferred dyestuffs of the present invention have the general formulae

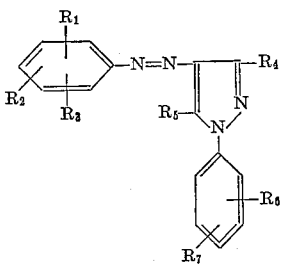

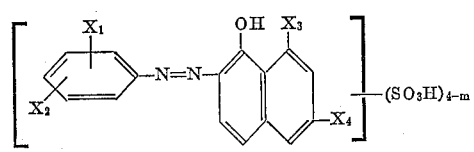

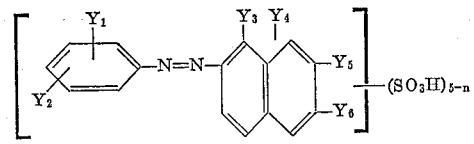

in which $R_1$ represents 4,5-dichloropyridazonyl-(1), 4,5-dibromopyridazonyl-(1) or the radical of the formula

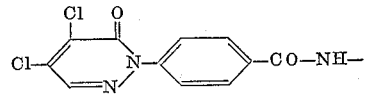

$R_2$ represents hydrogen, sulfonic acid or methyl, $R_3$ represents hydrogen or methoxy, $R_4$ represents methyl or aminocarbonyl, $R_5$ represents hydroxy or amino, $R_6$ represents hydrogen, chlorine, sulfonic acid or sulfonic acid amide, and $R_7$ represents hydrogen, methyl or chlorine. $X_1$ represents hydrogen, chlorine, acetylamino, nitro or the group of the formula

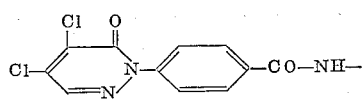

$X_2$ represents hydrogen, methyl, hydroxy, chlorine or methoxy, $X_3$ represents hydrogen, amino, acetylamino, benzoylamino or the group of the formula

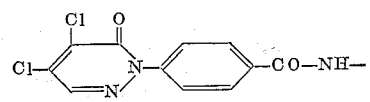

$X_4$ represents hydrogen, amino or the group of the formula

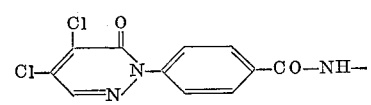

$m$ represents an integer from 1 to 3, and in which only one of the groups $X_1$, $X_3$ and $X_4$ represents the group of the formula

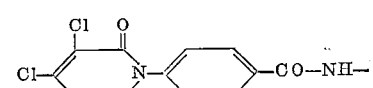

$Y_1$ represents 4,5-dichloropyridazonyl-(1) or 4,5-dibromopyridazonyl-(1) said group being attached to one of the positions meta and para, $Y_2$ represents hydrogen, methyl or methoxy, $Y_3$ represents hydroxy or amino, $Y_4$ represents hydrogen, amino, acetylamino, benzoylamino, dichlorobenzoylamino or a group of the formula

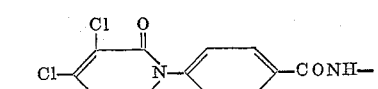

$Y_5$ represents hydrogen or 4-nitro-2-sulfophenylazo, $Y_6$ represents hydrogen, acetylamino or the group of the formula

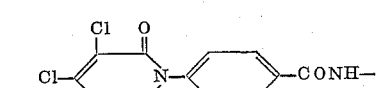

and $n$ represents an integer from 1 to 4.

The said new dyestuffs may be obtained in various ways, for example by diazotization of 1-(aminophenyl)-4,5-dihalogen-pyridazones-(6) and coupling of the resultant diazo compounds with aliphatic, aromatic or heterocyclic compounds capable of coupling. For the production of disazo dyestuffs which contain one to two 4,5-dihalogenpyridazone groups in the molecule there are used for example coupling components which can be coupled with two molecules of diazo compounds. Thus for example from 2 mols of diazotized 1-(3-aminophenyl)-4,5-dichloropyridazone and one mol of 1-amino-8-hydroxynaphthalene-3,6-disulfonic acid there is obtained by the usual manner of operation a disazo dyestuff of the formula

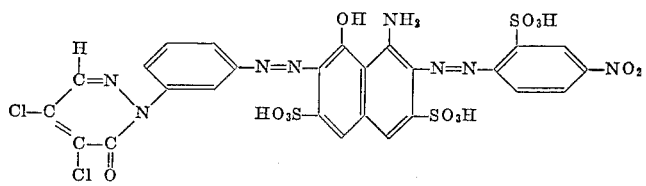

By using, instead of 2 mols of the diazotized aminophenyldihalogenpyridazone, only one mol thereof and coupling the resultant monoazo dyestuff with another diazotized amine, as for example diazotized 1-amino-4-nitrobenzene-2-sulfonic acid, there is obtained for example a disazo dyestuff of the formula

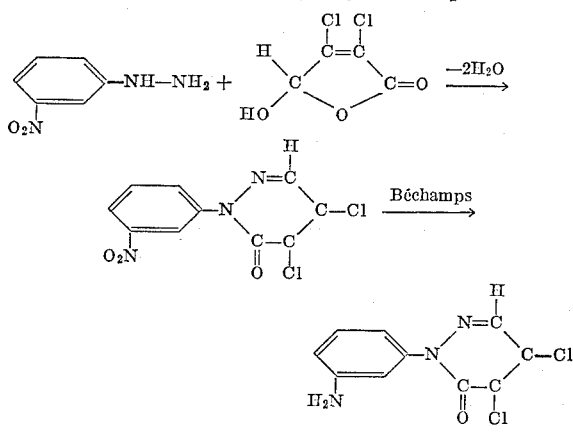

1-(aminophenyl)-4,5-dihalogenpyridazones-(6) which may be used as diazo components for the preparation of the new dyestuffs are for example 1-(3-aminophenyl)-4,5-dichloropyridazone-(6), 1-(3-aminophenyl)-4,5-dibromopyridazone-(6), 1-(4-aminophenyl)-4,5-dichloropyridazone-(6), 1-(4-aminophenyl)-4,5-dibromopyridazone-(6), 1-(3-amino-6-sulfophenyl)-4,5-dichloropyridazone-(6), 1-(4-amino-6-sulfophenyl)-4,5-dichloropyridazone-(6), 1-(3-amino-4-sulfophenyl)-4,5-dichloropyridazone-(6), 1-(3-amino-4-methylphenyl)-4,5-dichloropyridazone-(6) or 1-(3-amino-6-sulfophenyl)-4,5-dibromopyridazone-(6).

These aminophenyl-dihalogenpyridazones may be prepared for example by reacting the corresponding nitrophenylhydrazines with mucochloric acid or mucobromic acid, agents which split off water, such as anhydrous acetic acid or acetic anhydride, preferably being co-employed or the water formed distilled off azeotropically, and the 1-(nitrophenyl)-4,5-dihalogenpyridazones-(6) being reduced to the corresponding aminophenyl-dihalogenpyridazones by the method of Béchamps with iron and acetic acid. The course of the reaction may be seen from the following scheme given in respect of 1-(3-aminophenyl)-4,5-dichloropyridazone-(6) by way of example

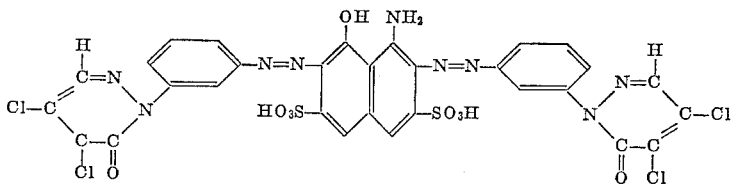

Further suitable diazo components are for example the following amines of which the preparation is described hereafter in Examples 51 and 59:

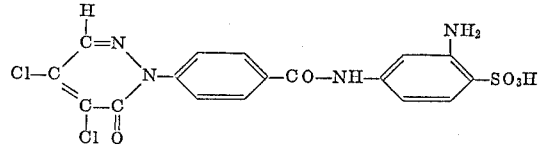

and

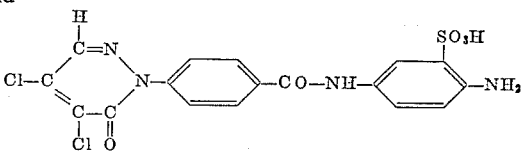

As coupling components which, with the diazotized abovementioned amines, yield the new azo dyestuffs according to this invention, there come into consideration compounds, capable of coupling, of the aromatic series and the heterocyclic series. Preferred coupling components are, from the aromatic series, alpha-naphthol and its sulfonic acid derivatives, for example alpha-naphthol-4-sulfonic acid or alpha-naphthol-3,8- or -4,8-disulfonic acid, alpha-naphthylamine and its sulfonic acid derivatives, for example alpha-naphthylamine-5-sulfonic acid, aminonaphthols, for example 1-amino-8-hydroxynaphthalene-3,6-disulfonic acid, 1-acetylamino-8-hydroxynaphthalene-3,6-disulfonic acid, 1-benzoylamino-8-hydroxynaphthalene-3,6-disulfonic acid, 1-(2,5-dichlorobenzoylamino)-8-hydroxynaphthalene-3,6-disulfonic acid, 1-amino-8-hydroxynaphthalene-4,6-disulfonic acid, 1-acetylamino-8-hydroxynaphthalene-4,6-disulfonic acid, 1-benzoylamino-8-hydroxynaphthalene-4,6-disulfonic acid, 1-(2,5-dichlorobenzoylamino)-8-hydroxynaphthalene-4,6-disulfonic acid, 1-hydroxy-6-acetylaminonaphthalene-3-sulfonic acid or 1-hydroxy-7-aminonaphthalene-3-sulfonic acid. Preferred coupling components of the heterocyclic series are for example 1-phenyl-5-hydroxypyrazoles and 1-phenyl-5-aminopyrazoles as well as the derivatives of these compounds, for example, 1-phenyl-3-methyl-5-hydroxypyrazole, 1-(2-chlorophenyl)-3-methyl-5-hydroxypyrazole, 1-(4-sulfophenyl)-3-methyl-5-hydroxypyrazole, 1-(2-chloro-4-sulfophenyl)-3-methyl-5-hydroxypyrazole, 1-(2,5-dichlorphenyl)-3-methyl-5-hydroxypyrazole, 1-phenyl-5-hydroxypyrazole-3-carboxylic acid amide and 1-phenyl-3-methyl-5-aminopyrazole.

For the production of azo dyestuffs which bear two dihalogenpyridazone groups in the molecule there are used for example coupling components which already contain a dihalogenpyridazone radical and of which the production is described hereafter.

Furthermore the new azo dyestuffs containing dihalogenpyridazone groups can be obtained by coupling diazotized aromatic amines with compounds, capable of coupling, which bear one to two dihalogenpyridazone radicals. Such coupling components are prepared for example by reacting compounds capable of coupling which contain an amino group with a 1-phenyl-4,5-dihalogenpyridazone-(6) which bears in the phenyl nucleus a carboxylic acid halide group or a sulfonic acid halide group.

A further possibility of preparing diazo or coupling components which contain the said dihalogenpyridazone groups comprises for example reacting compounds capable of coupling or aromatic nitro compounds which contain sulfonic acid halide or carboxylic acid halide groups with 1-(aminophenyl)-4,5-dihalogenpyridazones-(6) and, in the case of the nitro compounds, reducing the nitro groups to amino groups.

The new dyestuffs are eminently suitable for dyeing or printing textile materials of wool, synthetic linear polyamides and especially cellulose. Acid-binding substances are coemployed when dyeing or printing with the new dyestuffs. The dyeings and prints obtained are eminently fast to wet treatment.

In dyeing with the new dyestuffs the procedure may be for example that textile materials of cellulose are padded with an aqueous solution which contains the new dyestuff and after drying led through a bath which contains an acid-binding substance, such as sodium hydroxide, sodium carbonate, sodium hydrogen carbonate, potassium hydroxide or potassium carbonate, the dyestuff then being fixed on the fiber by steaming at 70° to 150° C. for a short time. Instead of steaming, there may also be used a treatment with air at temperatures between 70° and 200° C., preferably at 100° to 150° C. The acid-binding substances may however also be added to the padding bath. Furthermore it is possible to dye with the dyestuffs with an addition of acid-binding substances and possibly neutral salts, such as sodium chloride or sodium sulfate, at temperatures of 30° to 50° C. and to fix the dyestuff on the goods to be dyed by gradual increase in the bath temperature. Finally the textile materials of cellulose may be pretreated with solutions of acid-binding substances, dried, then dyed with the new dyestuffs and the dyestuffs fixed with steam or hot air.

In the printing of textile materials, for example of cellulose, the dyestuff is advantageously applied to the fiber together with a thickening agent, such as sodium alginate or tragacanth, possibly together with one of the usual printing auxiliaries, and an acid-binding substance and dried or steamed for a short time at temperatures between 70° and 200° C., preferably between 100° and 150° C. The textile materials may also be printed with the dyestuffs and one of the usual printing auxiliaries, dried, then passed through a bath containing the acid-binding substance and then treated with air at temperatures between 70° and 200° C., or steamed at 105° C. Finally a textile material which has been treated with acid-binding substances may be printed with dyestuffs, thickening agents and possibly printing auxiliaries and thereupon dried or steamed.

The following examples will further illustrate this invention but the invention is not restricted to these examples. The parts specified in the examples are parts by weight.

Example 1

30 parts of 1-(4-acetylaminophenyl)-4,5-dichloropyridazone-(6) are boiled for 6 to 12 hours together with 300 parts of water, 200 parts of propanol and 100 parts of hydrochloric acid, the mixture cooled to 5° C. and, while stirring, a solution of 7 parts of sodium nitrite in 25 parts of water is allowed to flow in. After stirring for 3 hours at 5° C., the diazotization mixture is filtered and the filtrate is allowed to flow in the course of 30 minutes into a solution of 38 parts of 1-(2-methyl-4-sulfophenyl)-3-methylpyrazolone-(5), 4 parts of sodium hydroxide and 70 parts of sodium acetate in 500 parts of water which is kept at 10° C. After about 10 hours, the reaction product is filtered off. There are obtained 45 parts of a dyestuff of the formula

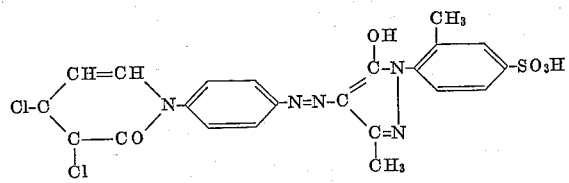

A cotton fabric is padded with an aqueous solution which contains 15 grams of this dyestuff per liter, squeezed out to a moisture content of 90% and dried. The fabric is then passed through a second aqueous padding bath which contains 15 grams of sodium hydroxide and 200 grams of sodium chloride per liter, squeezed out, steamed for 5 minutes at 105° C. and soaped at the boil. A yellow dyeing with very good fastness to water, washing, perspiration and rubbing is obtained.

1 - (4 - acetylaminophenyl) - 4,5 - dichloropyridazone-(6) can be obtained for example in the following way:

60 parts of 4-acetylamino-phenyl hydrazine hydrochloride, prepared by diazotization and subsequent reduction of 1-amino-4-acetylaminobenzene, are heated together with 51 parts of mucochloric acid, 300 parts of glacial acetic acid and 100 parts of acetic anhydride for 2 hours at 90° to 100° C. while stirring. The mixture is poured into water and the reaction product lltered off. 85 parts of 1-(4-acetylaminophenyl)-4,5-dichloropyridazone-(6) are obtained.

Example 2

A diazo solution prepared as in Example 1 from 30 parts of 1-(4-acetylaminophenyl)-4,5-dichloropyridazone-(6) is allowed to flow within 30 minutes at 10° C., into a solution of 75 parts of 1-hydroxy-8-benzoylaminonaphthalene-3,6-disulfonic acid, 4 parts of sodium hydroxide and 70 parts of sodium acetate in 500 parts of water and the mixture is stirred for 4 hours at 10° to 20° C. The reaction product is then filtered off. There are obtained 60 parts of a red dyestuff of the formula:

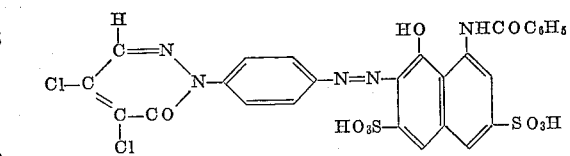

A fabric of staple fiber is padded with an aqueous solution which contains 20 grams of the dyestuff, 10 grams of sodium sulfate and 25 grams of sodium carbonate per liter, squeezed out, dried and treated for 3 minutes with hot air at 140° C. Then it is soaped at the boil. A red dyeing is obtained with very good fastness to water, washing, perspiration and rubbing.

By using as coupling component 1-hydroxy-6-acetylaminonaphthalene-3-sulfonic acid, a dyestuff is obtained which dyes cotton fast orange-red shades.

Example 3

28 parts of 1-amino-3-acetylaminobenzene-6-sulfonic acid are diazotized in known manner and the diazo solution is reduced with 70 parts of crystallized tin(II) chloride. The aqueous solution of 3-acetylamino-6-sulfophenyl hydrazine obtained is heated together with an aqueous solution of 17 parts of mucochloric acid for 2 hours at 90° C. The 1-(3-amino-6-sulfophenyl)-4,5-dichloropyridazone-(6) obtained is diazotized at about 5° C. in suspension with a solution of 7 parts of sodium nitrite in 15 parts of water and stirred for 6 hours at 10° C. In the course of 30 to 40 minutes there is then allowed to flow into the diazo solution a solution of 42 parts of 1-hydroxy-6-acetylaminonaphthalene-3-sulfonic acid, 4 parts of sodium hydroxide and 15 parts of crystallized sodium acetate in 500 parts of water. After stirring for 4 to 6 hours at room temperature there are obtained by filtration 55 parts of the dyestuff of the formula

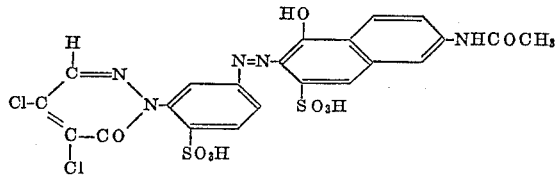

which dyes wool and cotton brilliant orange-red shades of excellent fastness.

Example 4

An aqueous solution of 17 parts of mucochloric acid is added to the solution of 3-acetylamino-6-sulfophenyl hydrazine obtained as in Example 3. The mixture is stirred for 20 hours at room temperature, the yellow reaction product is separated, dried and introduced at 20° C. into 150 parts of concentrated sulfuric acid. After stirring for 4 to 6 hours, the mixture is poured onto ice and the pale yellow reaction product is filtered off. For diazotization, the 1-(3-amino-6-sulfophenyl) - 4,5 - dichloropyridazone-(6) is dissolved at 10° C. in 80 parts of 5% caustic soda solution, an aqueous solution of 7 parts of sodium nitrite added and the alkaline solution allowed to flow into an ice-cooled mixture of 50 parts of concentrated hydrochloric acid and 300 parts of water. The mixture is stirred for 4 to 6 hours at 5° to 10° C.

For coupling, the suspension of the diazonium salt of 1-(3-amino-6-sulfophenyl) - 4,5 - dichloropyridazone-(6) thus obtained is allowed to flow into a solution of 17 parts of 1-hydronaphthalene-4-sulfonic acid, 4 parts of sodium hydroxide and 100 parts of crystallized sodium acetate in 500 parts of water which is kept at 10° C. After stirring for 6 hours at room temperature, the product is filtered off. There are obtained 30 parts of a dyestuff of the formula

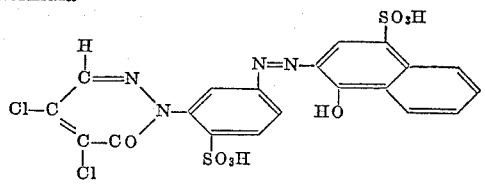

which dyes wool and cotton scarlet red shades.

Example 5

25 parts of the dyestuff obtained according to Example 4 are dissolved in 300 parts of water with the addition of such an amount of caustic soda solution that the pH value of the solution is 7, an aqueous solution of 30 parts of crystallized sodium acetate and an aqueous solution of 13 parts of copper(II) sulfate are added and a mixture of 10 parts of 30% hydrogen peroxide and 100 parts of water allowed to flow in in the course of an hour at 40° C., while stirring. The dyestuff of the probable formula

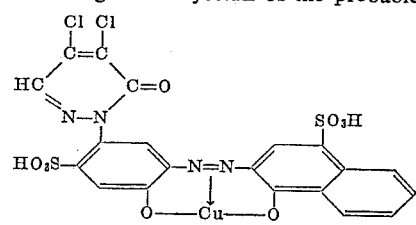

separated in a yield of 20 parts dyes wool and cotton bluish red to currant shades.

The dyestuffs in the following table, prepared in a way corresponding to Examples 1 to 4, dye wool and cotton in the shades given in the right-hand column.

(The symbol R in the formulae represents the grouping

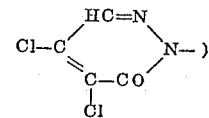

)

| Example No. | Dyestuff | Color of dyeing |
|---|---|---|
| 6 | ![structure] R—⟨⟩—N=N—C(OH)=C(C=N—CH₃)—N—⟨⟩—SO₃H | yellow. |
| 7 | HO₃S—⟨R⟩—⟨⟩—N=N—C(OH)=C(C=N—CH₃)—N—⟨Cl, SO₃H⟩ | greenish yellow. |
| 8 | HO₃S—⟨R⟩—⟨⟩—N=N—C(HO)=C(C=N—CONH₂)—N—⟨⟩ | yellow. |
| 9 | HO₃S—⟨R⟩—⟨⟩—N=N—C(NH₂)=C(C=N—CH₃)—N—⟨⟩ | greenish yellow. |

| Example No. | Dyestuff | Color of dyeing |
|---|---|---|
| 10 | R–C6H4(CH3)–N=N–[naphthalene with HO, SO3H, HO3S] | red. |
| 11 | HO3S–C6H4(R)–N=N–[naphthalene with NH2, SO3H] | orange. |
| 12 | R–C6H4(HO3S)–N=N–[naphthalene with HO, NHCOCH3, SO3H] | bluish red. |
| 13 | R,HO3S–C6H3–N=N–[naphthalene with HO, NHCO–C6H3Cl2, HO3S, SO3H] | Do. |
| 14 | R–C6H4–N=N–[naphthalene with HO, SO3H, SO3H] | Do. |

1-(3-aminophenyl)-4,5-dichloropyridazone-(6) used for Example 6 may be obtained for example in the following way:

140 parts of 1-amino-3-nitrobenzene are diazotized at 5° to 10° C. in a mixture of 1000 parts of water and 250 parts of hydrochloric acid with a solution of 70 parts of sodium nitrite in 150 parts of water and the diazo solution is allowed to flow into a solution of 700 parts of crystallized tin(II) chloride. The resultant solution of 3-nitrophenyl hydrazine is coupled with a solution of 170 parts of mucochloric acid in 500 parts of water and stirred for 6 hours at room temperature. After filtration, an orange-yellow reaction product is obtained having the melting point 199° C.; this is dried and introduced at 20° C. into 800 parts of 96% sulfuric acid. The mixture is stirred for 10 hours at room temperature and then poured into ice-water. 30 parts of the 1-(3-nitrophenyl)-4,5-dichloropyridazone-(6) thus obtained are suspended in a mixture, heated to 80° C., of 250 parts of water and 50 parts of propanol and the suspension allowed to flow in the course of 30 minutes into a suspension, heated to 100° C., of 50 parts of iron powder, 300 parts of water and 2 parts of anhydrous acetic acid. The iron sludge is filtered off and by cooling the filtrate there are obtained 20 parts of 1-(3-aminophenyl)-4,5-dichloropyridazone-(6).

A solution of 1-(3-aminophenyl)-4,5-dichloropyridazone-(6) which may be used directly for diazotization is also obtained in the following way:

15 parts of 1-acetylamino-3-aminobenzene are diazotized in a mixture of 300 parts of water and 25 parts of concentrated hydrochloric acid with an aqueous solution of 7 parts of sodium nitrite and the resultant diazo solution is allowed to flow into a mixture, cooled to 10° to 15° C., of 50 parts of crystallized tin(II) chloride, 20 parts of concentrated hydrochloric acid and 300 parts of water. After ten minutes, a solution of 17 parts of mucochloric acid in 100 parts of water is added to the said solution containing 1-acetylamino-3-hydrazinobenzene. After stirring for 15 to 20 hours at room temperature, the 3-acetylaminophenyl hydrazone of mucochloric acid has separated as a deep yellow product in a yield of 25 parts (79% of the theory). It is dried, introduced into 60 parts of concentrated sulfuric acid and the mixture stirred for 6 to 8 hours at 20° C. and then poured into ice-water, 1 - (3-acetylaminophenyl)-4,5-dichloropyridazone-(6) thereby being obtained in the form of a paste which, for saponification, is boiled for 2 hours in a mixture of 100 parts of hydrochloric acid and 500 parts of water. The hydrochloric acid solution of 1-(3-aminophenyl)-4,5-dichloropyridazone-(6) obtained needs 28 parts of a 23% sodium nitrite solution for diazotization, corresponding to a yield of 93% of the theory.

*Example 15*

55 parts of the dyestuff prepared by coupling 1-amino-4-nitrobenzene-2-sulfonic acid with 1-hydroxy-8-aminonaphthalene-3,6-disulfonic acid in acid medium in the usual way are dissolved together with 12 parts of sodium hydroxide and 30 parts of sodium carbonate in 1000 parts of water and into this mixture there is allowed to flow gradually at 10° C. while stirring a suspension of the diazonium salt of 1-(3-amino-6-sulfophenyl)-4,5-dichloropyridazone-(6) obtained according to Example 4. The mixture is stirred until the end of the coupling at room temperature and the reaction product filtered off. There are obtained 70 parts of a dyestuff of the formula

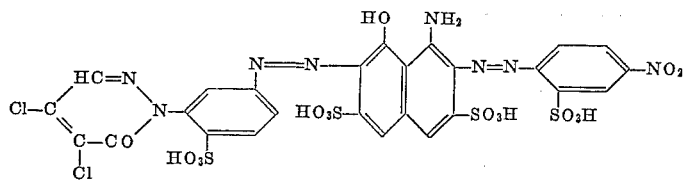

which dyes wool and cotton deep blue shades.

The following dyestuffs may be prepared in the way corresponding to Examples 1 to 4, the symbol R in each case representing the grouping:

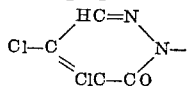

| Example No. | Dyestuff | Color of dyeing on polyamide |
|---|---|---|
| 16 | R—⟨⟩—N=N—C(HO-C-N-⟨⟩ / H₃C—C=N) | yellow. |
| 17 | R—⟨⟩—N=N—C(HO-C-N-⟨⟩Cl / H₃C—C=N) | Do. |
| 18 | R—⟨⟩—N=N—C(H₂N-C-N-⟨⟩ / H₃C—C=N) | greenish yellow. |

*Example 19*

25 parts of 1-(4-methylphenyl)-4,5-dichloropyridazone-(6) obtained as a colorless compound melting at 146° C. by reacting equimolecular amounts of 4-methylphenyl-hydrazine and mucochloric acid in 2% to 5% hydrochloric acid, are dissolved in 200 parts of concentrated sulfuric acid and to this solution 7 parts by volume of 65% nitric acid are added dropwise while cooling. The mixture is stirred for 12 hours at room temperature and then poured on ice. The nitro compound formed is reduced in conventional manner and the 1-(4-methyl-3-aminophenyl)-4,5-dichloropyridazone-(6) which is obtained as yellow crystals melting at 163° C., is diazotized and the diazo suspension is allowed to flow into a solution of 40 parts of 1-(2-chloro-5-sulfophenyl)-3-methyl-pyrazolone-(5), 4 parts of sodium hydroxide and 80 parts of crystallized sodium acetate in 500 parts of water. By filtering the solution after stirring for from 4 to 6 hours 48 parts of a dyestuff with the probable formula

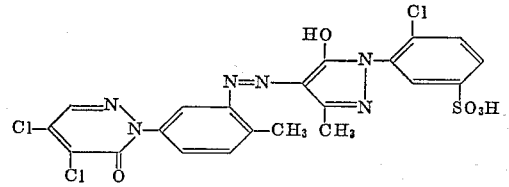

are obtained which dyes wool and cotton yellow shades.

*Example 20*

390 parts of the sodium salt of sulfanilic acid are dissolved in 800 parts of ice-water and to the mixture there are added 217 parts of 96% sulfuric acid. Then in the course of half an hour, an aqueous solution of 138 parts of sodium nitrite is allowed to flow in. The mixture is stirred for an hour at 5° C. and the diazonium salt is filtered off. It is gradually introduced into a solution, cooled to 5° C., of 1000 parts of crystallized sodium sulfite in 1500 parts of water. The orange colored solution of the diazo sulfonate is stirred for another hour at 10° to 20° C., heated to 90° C. and 400 parts of 35% aqueous hydrochloric acid allowed to flow in in the course of an hour. Into the hydrochloric acid solution of phenyl hydrazine-4-sulfonic acid thus obtained there are introduced while stirring 340 parts of mucochloric acid and the temperature of the mixture kept for an hour at 90° to 95° C. There is observable temporarily the orange color of the hydrazone which gradually becomes lighter. It is allowed to cool, the reaction product filtered off and washed with a little ice-water. The yield of 1-(4-sulfophenyl)-4,5-dichloropyridazone-(6) amounts to 575 parts, corresponding to 90% of the theory.

32 parts of the dried reaction product are introduced into a mixture of 200 parts of 96% sulfuric acid and 8 parts of 65% nitric acid and the temperature kept at 20° C. The nitration is ended after two hours. The reaction mixture is added to ice-water and the reaction product deposited by salting out with sodium chloride. The isolated nitro compound is dissolved in 500 parts of water, the solution adjusted to a pH value of 6 to 7 by adding sodium acetate and the mixture reduced with 50 parts of iron powder which has been etched in 100 parts of water and 2 parts of glacial acetic acid at 100° C., according to the process of Béchamps. The reduction is ended after 30 minutes. The mixture is filtered while hot, the filtrate cooled and the dissolved iron salts precipitated by addition of sodium carbonate at 5° C. It is again filtered and a pH value of 7 is set up in the filtrate by adding hydrochloric acid. The reduction may also be carried out catalytically with Raney nickel at 20° C. To the aqueous solution of 1-(2-amino-4-sulfophenyl)-4,5-dichloropyrid-azone-(6) thus obtained there are added 50 parts of 35% hydrochloric acid and diazotization effected with an aqueous solution of 7 parts of sodium nitrite at 5° C. The diazo suspension thus obtained is allowed to flow into a solution of 30 parts of 1-(2-chloro-5-sulfophenyl)-3-methylpyrazolone-(5) in 400 parts of water at 10° C. which has been adjusted to the pH value 6 with sodium acetate. The coupling is ended after two hours. There are obtained 42 parts of a yellow dyestuff of the formula

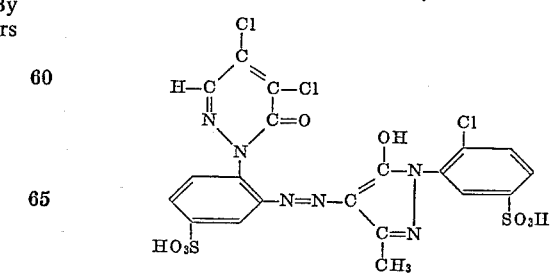

in the form of its sodium salt. The dyestuff dyes wool and cotton in the presence of acid-binding agents in yellow shades of excellent fastness.

*Example 21*

32 parts of the 1-(4-sulfophenyl)-4,5-dichloropyrid-azone-(6) obtained in accordance with Example 20 are introduced into a mixture of 200 parts of 96% sulfuric acid and 8 parts of 65% nitric acid and the mixture heated for 4 to 5 hours at 80° to 90° C. Besides nitration, there also occurs a sulfonation and there is obtained (after reduction carried out in the corresponding way with iron or by catalytic reduction) an aqueous solution of 1-(2-amino-4,6-disulfophenyl)-4,5-dichloropyridazone-(6).

This solution, acidified with 50 parts of hydrochloric acid, is diazotized with an aqueous solution of 7 parts of sodium nitrite and coupled with a solution, adjusted to the pH value 6 by adding sodium acetate, of 40 parts of 1 - acetylamino-8-hydroxynaphthalene-3,6-disulfonic acid in 350 parts of water. 60 parts of red dyestuff are obtained having the formula

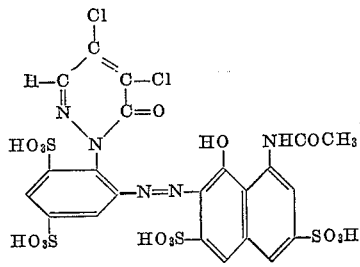

which dyes wool and cotton in the presence of acid-binding agents in red shades of very good fastness.

*Example 22*

37 parts of 1-(2-methoxy-4-amino-5-sulfophenyl)-4,5-dichloropyridazone-(6) are diazotized in hydrochloric acid solution with an aqueous solution of 7 parts of sodium nitrite and the diazo suspension thus obtained is allowed to flow into an aqueous solution of 26 parts of 1-(4-sulfophenyl)-3-methylpyrazolone-(5) which has been adjusted to the pH value 6. The coupling is ended after 30 minutes. By salting out there are obtained 62 parts of the yellow dyestuff of the formula

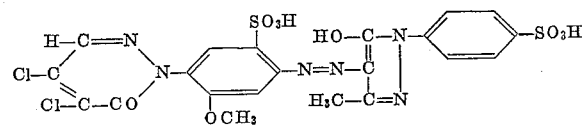

which dyes cotton and wool in the presence of acid-binding agents in powerful yellow shades of excellent fastness to wet treatment and light.

The above-specified diazo component is obtained from 1-amino-2-methoxy-4-nitrobenzene-5-sulfonic acid by diazotization, reduction of the diazonium salt to the corresponding hydrazine, reaction of the hydrazine with mucochloric acid and reduction of the nitro group to the amino group.

If diazotized 1-(2-methoxy-4-amino-5-sulfophenyl)-4,5-dichloropyridazone-(6) is diazotized, instead of with 1-(4-sulfophenyl)-3-methylpyrazolone-(5), with the following coupling components, new dyestuffs are obtained which give on cotton dyeings of the shades set out in the third column:

| Example No. | Coupling component | Color of dyeing on cotton |
|---|---|---|
| 23 | 1-phenyl-3-methylpyrazolone-(5) | yellow. |
| 24 | 1-(2-chloro-5-sulfophenyl)-3-methylpyrazolone-(5). | Do. |
| 25 | 1-hydroxynaphthalene-4-sulfonic acid | red. |
| 26 | 1-hydroxy-8-benzoylaminonaphthalene-4,6-disulfonic acid. | bluish-red. |

By using the diazo component described in Example 21 there are obtained by coupling with the following coupling components, dyestuffs having the shade of color indicated in the third column:

| Example No. | Coupling component | Color of dyeing on cotton |
|---|---|---|
| 27 | 1-(2-chloro-5 sulfophenyl)-3-methylpyrazolone-(5). | yellow. |
| 28 | 1-(3-amidosulfonylphenyl)-3-methylpyrazolone-(5). | Do. |
| 29 | alpha-naphthol | red. |
| 30 | 1-hydroxy-8-aminonaphthalene-3,6-disulfonic acid. | bluish-red. |
| 31 | 1-hydroxynaphthalene-4,8-disulfonic acid | Do. |

*Example 32*

57 parts of 1 - (4-carboxyphenyl)-4,5-dichloropyridazone-(6) (prepared by diazotization of 4-aminobenzoic acid, reduction of the diazo compound with sodium sulfite and reaction of the resultant hydrazine compound with mucochloric acid) are heated together with 70 parts of thionyl chloride, 2 parts of pyridine in 200 parts of nitrobenzene for 3 hours at 90° C. By cooling there are obtained 48 parts of the compound of the formula

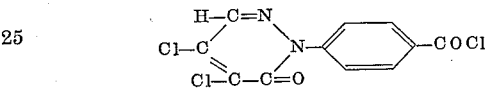

of the melting point 153° to 155° C.

A suspension of 35 parts of this acid chloride in 200 parts of acetone and 200 parts of tetrahydrofurane are allowed to flow at 20° C. in the course of an hour into an aqueous solution of 32 parts of 1-hydroxy-8-amino-naphthalene-3,6-disulfonic acid which has been adjusted to the pH value 6. By slowly adding an aqueous solution of 20 parts of sodium acetate, a pH of 6 is maintained in the mixture. There are obtained 55 parts of a compound of the formula

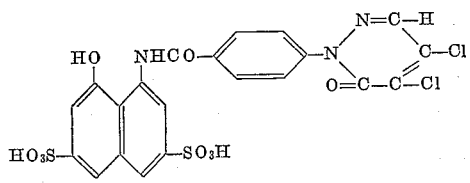

which, by coupling with the diazotized amines of the following table, give new dyestuffs of which the shades of color are given in the third column:

| Example No. | Diazo component | Color of dyeing on cotton |
|---|---|---|
| 33 | aniline | bluish-red. |
| 34 | 4-chloroaniline | Do. |
| 35 | 1-aminobenzene-2-sulfonic acid | Do. |
| 36 | 1-aminobenzene-2,4-disulfonic acid | Do. |
| 37 | sulfanilic acid | Do. |
| 38 | 1-amino-3-acetylaminobenzene-6-sulfonic acid | Do. |
| 39 | 1-amino-4-acetylaminobenzene-6-sulfonic aicd | Do. |
| 40 | 1-amino-2-hydroxybenzene-5-sulfonic acid | Do. |
| 41 | 1-amino-2-hydroxy-5-nitrobenzene | violet. |
| 42 | 1-amino-2-methoxy-5-nitrobenzene | Do. |

*Example 43*

The carboxylic acid chloride described in Example 32 is reacted in the way therein described with 1-hydroxy-6-amino-naphthalene-3-sulfonic acid. A compound of the formula

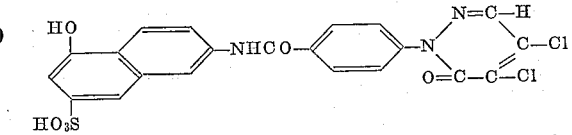

is obtained which, by coupling with the diazotized amines of the following table, gives new dyestuffs of which the shades of color are given in the third column:

| Example No. | Diazo component | Color of dyeing on cotton |
|---|---|---|
| 44 | 1-aminobenzene-2-sulfonic acid | orange. |
| 45 | 2,5-dichloroaniline | Do. |
| 46 | 1-aminobenzene-2,4-disulfonic acid | Do. |
| 47 | 1-amino-3-acetylaminobenzene-6-sulfonic acid | Do. |
| 48 | 1-amino-2-hydroxybenzene-5-sulfonic acid | Do. |
| 49 | 1-amino-2-methoxy-5-nitrobenzene | red. |
| 50 | 1-amino-2-hydroxy-5-nitrobenzene | Do. |

*Example 51*

The carboxylic acid chloride described in Example 32 is allowed to act in the mol ratio 1:1 on 1,3-diaminobenzene-4-sulfonic acid. There is obtained the amine of the formula

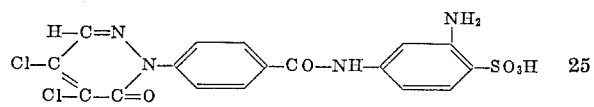

which after diazotization and coupling with the compounds of the following table yield new dyestuffs of the shades of color given in the third column:

| Example No. | Coupling component | Color of dyeing on cotton |
|---|---|---|
| 52 | 1-phenyl-3-methylpyrazolone-(5) | yellow. |
| 53 | 1-(4-sulfophenyl)-3-methyl-pyrazolone-(5) | Do. |
| 54 | 1-(2-chloro-5-sulfophenyl)-3-methylpyrazolone-(5). | Do. |
| 55 | 1-hydroxynaphthalene-4-sulfonic acid | red. |
| 56 | 1-hydroxy-6-aminonaphthalene-3-sulfonic acid | orange. |
| 57 | 1-hydroxy-8-acetylaminonaphthalene-3,6-disulfonic acid. | bluish-red. |
| 58 | 1-hydroxy-8-benzoylaminonaphthalene-4,6-disulfonic acid. | Do. |

*Example 59*

The carboxylic acid chloride described in Example 32 is allowed to act in the way described in Example 51 on 1,4-diaminobenzene-3-sulfonic acid. There is obtained the amine of the formula

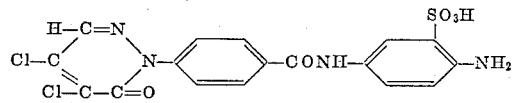

which, after diazotization and coupling with the compounds of the following table, gives new dyestuffs of the shades of color given in the third column of the table:

| Example No. | Coupling component | Shade of the dyeing on cotton |
|---|---|---|
| 60 | 1-phenyl-3-methylpyrazoline-(5) | yellow. |
| 61 | 1-(4-sulfophenyl)-3-methylpyrazoline-(5) | Do. |
| 62 | 1-(2-chloro-5-sulfophenyl)-3-methylpyrazolone-(5). | Do. |
| 63 | 1-hydroxynaphthalene-4-sulfonic acid | red. |
| 64 | 1-hydroxy-6-aminonaphthalene-3-sulfonic acid | orange. |
| 65 | 1-hydroxy-8-acetylaminonaphthalene-3,6-disulfonic acid. | bluish-red. |
| 66 | 1-hydroxy-8-benzoylaminonaphthalene-4,6-disulfonic acid. | Do. |

*Example 67*

A hydrochloric acid aqueous solution of 1-(2-amino-4,6-disulfophenyl)-4,5-dichloropyridazone-(6) is diazotized as described in Example 21 and coupled with the coupling component described in Example 32. A bluish-red dyestuff of the formula

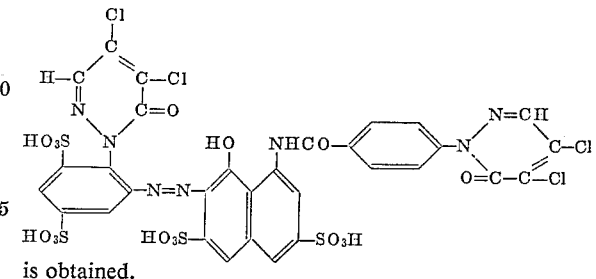

is obtained.

*Example 68*

1-(3-amino-6-sulfophenyl)-4,5-dichloropyridazone is diazotized as described in Example 4 and coupled with the compound described in Example 43 of the formula

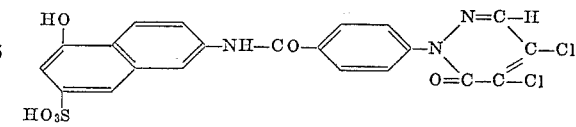

An orange red dyestuff is obtained having the formula

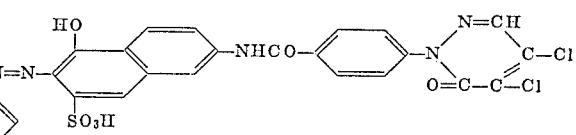

*Example 69*

The 3-acetylamino-6-sulfophenyl hydrazine described in Example 3 is reacted as therein described with mucobromic acid and the 1-(3-amino-6-sulfophenyl)-4,5-dibromopyridazone-(6) thus obtained coupling with 1-(4-sulfophenyl-3-methylpyrazolone-(5) in the usual way. The yellow dyestuff of the formula

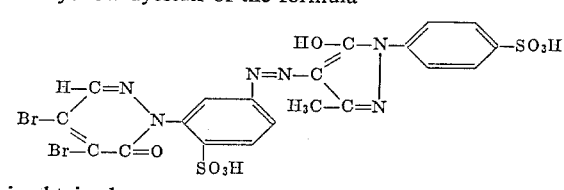

is obtained.

*Example 70*

A cotton fabric is padded in an aqueous solution which contains per liter 15 grams of the azo dyestuff described in the first paragraph of Example 22 and 4.4 grams of sodium hydroxide. The impregnated fabric is then dried and treated with hot air at 150° C. for 3 minutes. After vigorous soaping there is obtained a pure yellow dyeing which exhibits a very good fastness to light and excellent wet fastness properties.

*Example 71*

A staple fiber fabric padded with an aqueous solution which contains per liter 20 grams of the dyestuff from Example 25 and 25 grams of crystallized sodium carbonate. The fabric is dried, steamed for 5 minutes at 100° C. and thoroughly soaped at the boiling temperature. A powerful red dyeing is obtained having very good fastness to water, washing and perspiration and excellent fastness to light.

*Example 72*

A cotton fabric is padded with an aqueous solution which contains per liter 15 grams of the azo dyestuff described in Example 69 and 4.4 grams of sodium hydroxide. The fabric is dried, treated for 3 minutes with hot air at 120° C. and soaped at the boiling temperature. A yellow dyeing is obtained with very good fastness to light, washing, water and perspiration.

*Example 73*

A cotton fabric is printed with a printing paste which contains, in 1000 parts, 20 parts of the dyestuff described in the first part of Example 2, 150 parts of urea, 360 parts of water, 450 parts of sodium alginate thickening (40/1000), 15 parts of sodium carbonate and 5 parts of sodium hydroxide. The printed fabric is dried and steamed for 5 minutes at 105° C. The printed fabric is soaped at boiling temperature and there is obtained a red print with very good wet fastness properties, excellent fastness to rubbing and good fastness to light.

This application is a division of application Serial No. 38,107, filed June 23, 1960, now abandoned.

We claim:

1. An azo dye having the formula selected from the group consisting of

[formulas]

in which $R_1$ represents a group selected from the class consisting of
  4,5-dichloropyridazonyl-(1)-
  4,5-dibromopyridazonyl-(1)
  and the radical of the formula

[formula]

$R_2$ represents a group selected from the class consisting of hydrogen, sulfonic acid and methyl, $R_3$ represents a group selected from the class consisting of hydrogen and methoxy, $R_4$ represents a group selected from the class consisting of methyl and aminocarbonyl, $R_5$ represents a group selected from the class consisting of hydroxy and amino, $R_6$ represents a group selected from the class consisting of hydrogen, chlorine, sulfonic acid and sulfonic acid amide, and $R_7$ represents a group selected from the class consisting of hydrogen, methyl and chlorine, $X_1$ represents a group selected from the class consisting of hydrogen, chlorine, acetylamino, nitro and the group of the formula

[formula]

$X_2$ represents a group selected from the class consisting of hydrogen, methyl, hydroxy, chlorine and methoxy, $X_3$ represents a group selected from the class consisting of hydrogen, amino, acetylamino, benzoylamino and the group of the formula

[formula]

$X_4$ represents a group selected from the class consisting of hydrogen, amino and the group of the formula

[formula]

$m$ represents an integer from 1 to 3, and in which only one of the groups $X_1$, $X_3$ and $X_4$ represents the group of the formula

[formula]

$Y_1$ represents a group selected from the class consisting of 4,5-dichloropyridazonyl-(1) and 4,5-dibromopyridazonyl-(1) said group being attached to one of the positions meta and para, $Y_2$ represents a group selected from the class consisting of hydrogen, methyl and methoxy, $Y_3$ represents a group selected from the class consisting of hydroxy and amino, $Y_4$ represents a group selected from the class consisting of hydrogen, amino, acetylamino, benzoylamino, dichlorobenzoylamino and a group of the formula

[formula]

$Y_5$ represents a group selected from the class consisting of hydrogen and 4-nitro-2-sulfophenylazo, $Y_6$ represents a group selected from the class consisting of hydrogen, acetylamino and the group of the formula

[formula]

and $n$ represents an integer from 1 to 4.

2. The dye of the formula

[formula]

3. The dye of the formula

[formula]

4. The dyestuff of the formula
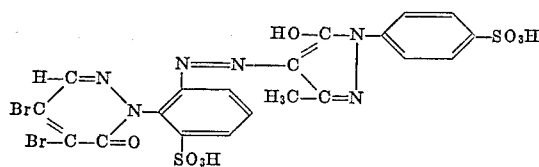
5. The dyestuff of the formula
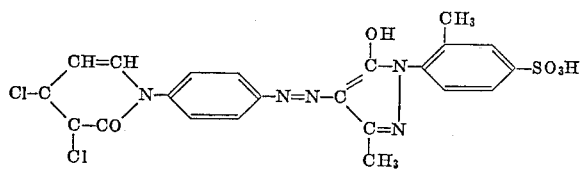
6. The dyestuff of the formula
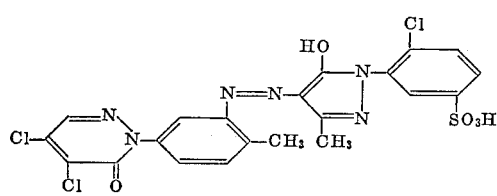
7. The dye of the formula
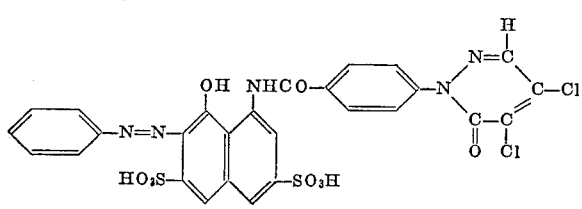
8. The dye of the formula
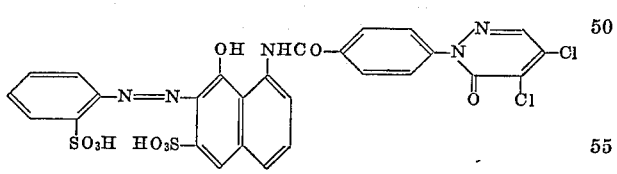
9. The dye of the formula
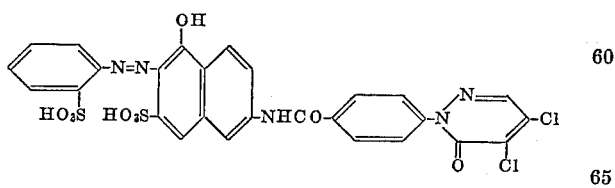
10. The dye of the formula
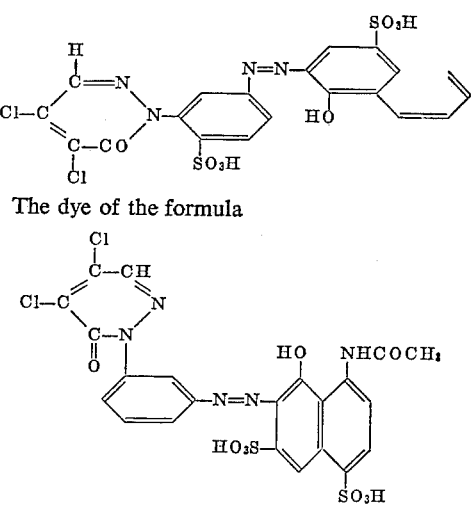
11. The dye of the formula
12. The dyestuff of the formula
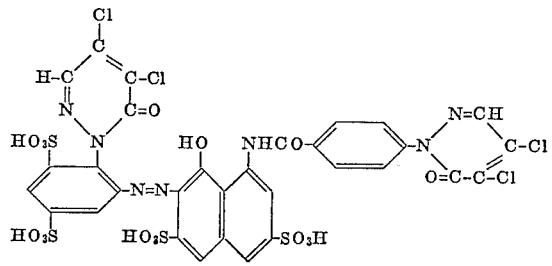
13. The dyestuff of the formula
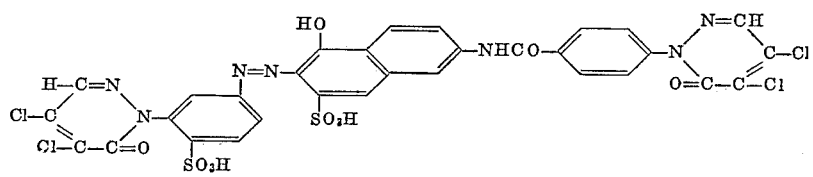
14. The dyestuff of the formula
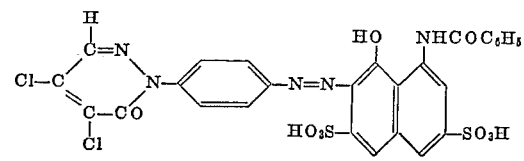
No references cited.